(12) United States Patent
Argue et al.

(10) Patent No.: US 8,676,653 B2
(45) Date of Patent: Mar. 18, 2014

(54) USE OF OPTICAL IMAGES TO AUTHENTICATE AND ENABLE A RETURN WITH AN ELECTRONIC RECEIPT

(75) Inventors: Stuart Argue, Palo Alto, CA (US); Anthony Emile Marcar, San Francisco, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 0 days.

(21) Appl. No.: 13/563,371

(22) Filed: Jul. 31, 2012

(65) Prior Publication Data
US 2014/0040053 A1 Feb. 6, 2014

(51) Int. Cl.
G06Q 20/00 (2012.01)
G06Q 30/00 (2012.01)
H04W 24/00 (2009.01)

(52) U.S. Cl.
USPC ........................ 705/17; 705/14.26; 455/456.2

(58) Field of Classification Search
USPC .............................. 705/17, 14.23; 455/456.2
See application file for complete search history.

(56) References Cited

U.S. PATENT DOCUMENTS

| 7,299,970 | B1* | 11/2007 | Ching | 235/375 |
|---|---|---|---|---|
| 7,428,988 | B1* | 9/2008 | Starr | 235/383 |
| 7,577,613 | B2* | 8/2009 | Tramontano et al. | 705/43 |
| 8,381,969 | B1* | 2/2013 | Miller et al. | 235/379 |
| 2001/0037207 | A1* | 11/2001 | Dejaeger | 705/1 |
| 2005/0192884 | A1* | 9/2005 | Raines | 705/35 |
| 2005/0240482 | A1* | 10/2005 | Ohkawa et al. | 705/24 |
| 2007/0094087 | A1* | 4/2007 | Mitchell et al. | 705/22 |
| 2009/0076870 | A1* | 3/2009 | Hammond et al. | 705/7 |
| 2009/0084840 | A1* | 4/2009 | Williams et al. | 235/379 |
| 2009/0212113 | A1* | 8/2009 | Chiu et al. | 235/462.41 |
| 2009/0271265 | A1* | 10/2009 | Lay et al. | 705/14.38 |
| 2010/0095251 | A1* | 4/2010 | Dunko | 715/863 |
| 2011/0016007 | A1* | 1/2011 | Shiftan et al. | 705/16 |
| 2011/0016008 | A1* | 1/2011 | Maraz et al. | 705/21 |
| 2011/0153060 | A1* | 6/2011 | Yepez et al. | 700/218 |
| 2011/0178863 | A1* | 7/2011 | Daigle | 705/14.31 |
| 2011/0309150 | A1* | 12/2011 | Jovanovski et al. | 235/462.06 |
| 2011/0311094 | A1* | 12/2011 | Herzog et al. | 382/100 |
| 2012/0084135 | A1* | 4/2012 | Nissan et al. | 705/14.38 |
| 2012/0096249 | A1* | 4/2012 | Rubin et al. | 713/1 |
| 2012/0101887 | A1* | 4/2012 | Harvey et al. | 705/14.23 |
| 2012/0164990 | A1* | 6/2012 | Amora et al. | 455/414.1 |
| 2012/0166296 | A1* | 6/2012 | Hammond et al. | 705/21 |
| 2012/0166298 | A1* | 6/2012 | Smith et al. | 705/24 |
| 2012/0214515 | A1* | 8/2012 | Davis et al. | 455/456.3 |
| 2012/0221446 | A1* | 8/2012 | Grigg et al. | 705/30 |
| 2012/0229658 | A1* | 9/2012 | Chi Kwong | 348/207.1 |

(Continued)

Primary Examiner — Matthew Gart
Assistant Examiner — Ashford S Hayles
(74) Attorney, Agent, or Firm — David R. Stevens; Stevens Law Group

(57) ABSTRACT

A method is disclosed for authenticating and enabling returns at a physical store location and based off of an electronic receipt. The electronic receipt may be viewed on a mobile electronic device with electronic receipts software thereon. The electronic receipts software may use machine readable codes to verify whether a customer is present at a returns terminal at a physical store location. More particularly, the electronic receipts software may contain a bar code reader module and use the camera of the mobile electronic device to capture a machine readable code such as a bar code or QR code. The electronics receipts software may recover data from the machine readable code which identifies the store, retail location, etc. This information may be compared against known values to determine that the customer is present at a returns terminal.

18 Claims, 14 Drawing Sheets

(56) References Cited

U.S. PATENT DOCUMENTS

| | | |
|---|---|---|
| 2012/0253915 A1* | 10/2012 | Sock ............................ 705/14.34 |
| 2012/0265623 A1* | 10/2012 | Zhu et al. ......................... 705/16 |
| 2012/0265696 A1* | 10/2012 | Tuchman et al. ............. 705/304 |
| 2012/0271725 A1* | 10/2012 | Cheng ............................. 705/21 |
| 2012/0280040 A1* | 11/2012 | Carney et al. ................. 235/383 |
| 2012/0284130 A1* | 11/2012 | Lewis et al. ...................... 705/16 |
| 2012/0290422 A1* | 11/2012 | Bhinder .......................... 705/21 |
| 2012/0296686 A1* | 11/2012 | Fugman et al. .............. 705/7.19 |
| 2012/0316950 A1* | 12/2012 | LaPorte et al. ............. 705/14.33 |
| 2013/0005352 A1* | 1/2013 | Jones et al. ................. 455/456.1 |
| 2013/0009774 A1* | 1/2013 | Sabeta .......................... 340/540 |
| 2013/0024308 A1* | 1/2013 | Ramaswamy et al. .......... 705/18 |
| 2013/0030915 A1* | 1/2013 | Statler et al. ................ 705/14.54 |
| 2013/0085889 A1* | 4/2013 | Fitting et al. ................ 705/26.35 |
| 2013/0085941 A1* | 4/2013 | Rosenblatt et al. ............. 705/44 |
| 2013/0191232 A1* | 7/2013 | Calman et al. ................... 705/18 |
| 2013/0203439 A1* | 8/2013 | Lifshitz et al. ............. 455/456.2 |
| 2013/0211900 A1* | 8/2013 | Dessert ...................... 705/14.27 |
| 2013/0256403 A1* | 10/2013 | MacKinnon Keith ........ 235/375 |

* cited by examiner

USE OF OPTICAL IMAGES TO AUTHENTICATE AND ENABLE A RETURN WITH AN ELECTRONIC RECEIPT

RELATED APPLICATIONS

This application is related to U.S. application Ser. No. 13/563,309, filed Jul. 31, 2012. The application is incorporated herein by reference for all purposes.

BACKGROUND

1. Field of the Invention

This invention relates to point-of-sale systems and more particularly to systems and methods for facilitating item returns from electronic receipts.

This application is related to U.S. application Ser. No. 13/625,773, filed Sep. 24, 2012, U.S. application Ser. No. 13/851,878, filed Mar. 27, 2013, U.S. application Ser. No. 13/625,789, filed Sep. 24, 2012, and U.S. application Ser. No. 13/625,810, filed Sep. 24, 2012. The application is incorporated herein by reference for all purposes.

2. Background of the Invention

Many point-of-sale (POS) systems currently in use today do not support important emerging technologies. For example, current POS systems are limited in their ability to handle return transactions based on electronic receipts. As a result, the adaptation of electronic receipts is hindered or prevented by the inability to adequately handle subsequent transactions such as returns. Accordingly, what is needed is a system and method for processing returns based on electronic receipts.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
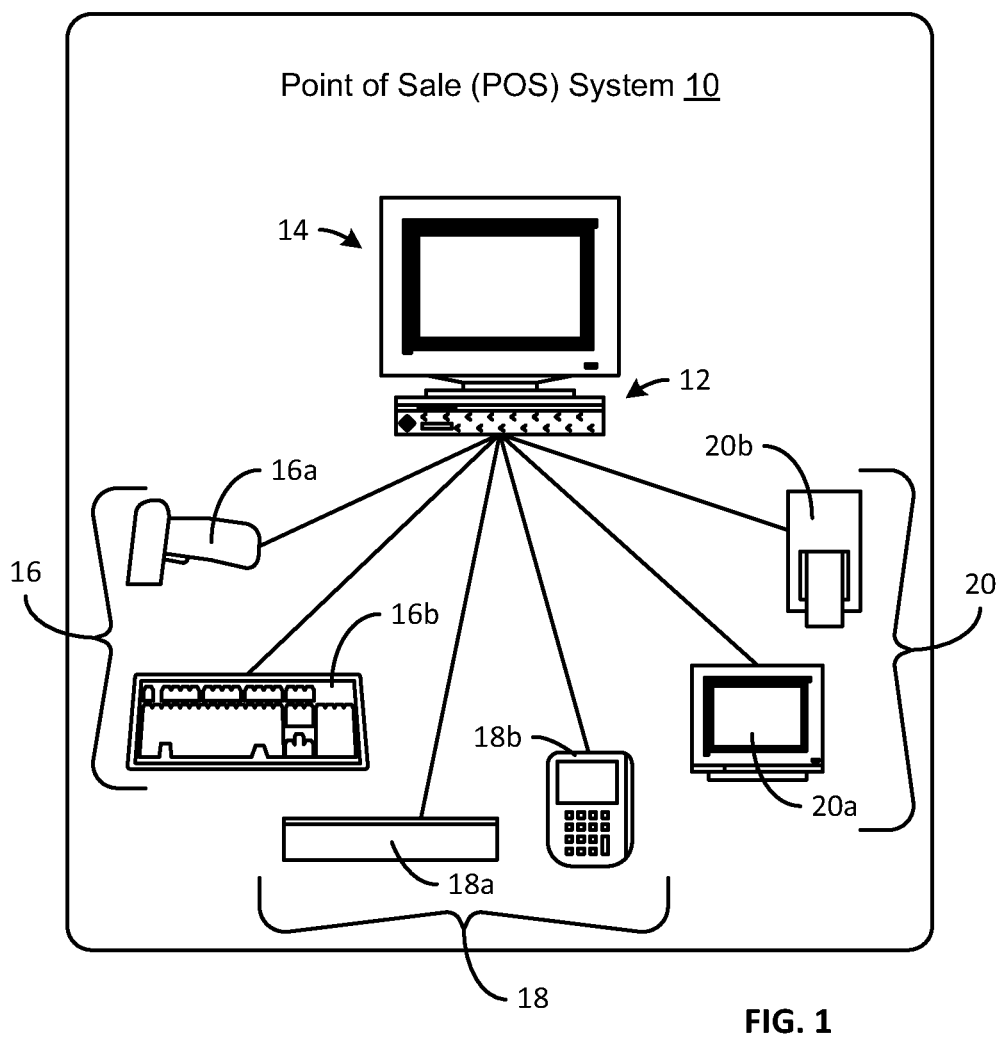
FIG. 1 is a schematic block diagram of one embodiment of a point-of-sale (POS) system for implementing methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide a system and methods for facilitating returns made in person at a store with an electronic receipt. For example, a customer may have made a previous purchase at a store and received an electronic receipt instead of a conventional paper receipt. Afterwards, the customer may desire to return one or more items from the purchase.

In selected embodiments, the returns process may involve the customer's mobile electronic device, such as a smart phone or tablet. The electronic receipt may be displayed on the mobile electronic device and the device may include software which allows the customer to make a return. The software may allow the customer to interface with the electronic receipt and with the POS system during the returns process. The software may hinder or prevent the customer from proceeding with the return unless the customer is present at a POS terminal at a store. The software may interact with the POS terminal to verify that the customer is at a POS terminal. Upon interaction with the POS terminal, the software may then allow the customer to proceed with the return.

In certain embodiments, a machine-readable code may be used to interact between the customer's mobile electronic device and the POS system. The machine readable code may comprise a conventional barcode or a two-dimensional barcode (e.g., a Quick Response (QR) Code). The data encoded within a machine-readable code may vary between different embodiments and different purposes or goals of the embodiment. In selected embodiments, a machine-readable code may encode a transaction identification (ID) uniquely identifying a particular transaction (e.g., purchase, return, or the like). Alternatively, or in addition thereto, a machine-readable code may encode data regarding the POS terminal and/or the store where the terminal is located.

In general, the purpose of a return system is to facilitate a returns process which is convenient to the customer and which also provides a desired measure of security. Many challenges arise in using electronic receipts. In particular, the use of electronic receipts when returning items raises a variety of challenges in ensuring that the returns process is handled in compliance with store policy and in ensuring that the store records and information about the initial sale transaction and the return transaction match the electronic receipt maintained by the customer. For example, it is typically desirable to provide some security whereby a customer cannot easily complete a return for a product which they have not purchased or for a product which they have already returned. It is also desirable to make the returns process streamlined and convenient, as this improves the customer experience as well as reduces the store workload to complete a return.

In completing a return with an electronic receipt, it may often be desirable to update the electronic receipt which the customer possesses. This may ensure that the customer has accurate information about previous transactions. It may also be desirable to limit the customer's ability to complete a return if the customer is not present at an appropriate POS system. Problems may arise if a customer completes the returns process within software on their mobile electronic device without being present at a store returns terminal as the electronic receipt may then reflect that an item was returned without having appropriately processing the return at the store. This may prevent the customer from actually returning the item at the store.

It is often desirable that certain features of electronic receipt management software on the customer's mobile electronic device are disabled unless the customer is at a POS terminal at a store to complete a return. For example, it is often desirable to prevent a customer from completing a return on the electronic receipts software or from modifying a receipt to indicate that an item has been returned unless the customer is actually present at a returns POS terminal and is engaged in completing an actual return. Accordingly, it is desirable to verify that the customer is at an appropriate POS terminal. It is further desirable to activate certain features of the electronic receipt management software on the customer's mobile electronic device when the customer is present at an appropriate POS terminal. Data may be exchanged between the customer's mobile electronic device and the POS terminal or the POS terminal environment to verify that the customer is present at an appropriate POS terminal.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support processing returns based on an electronic receipt.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
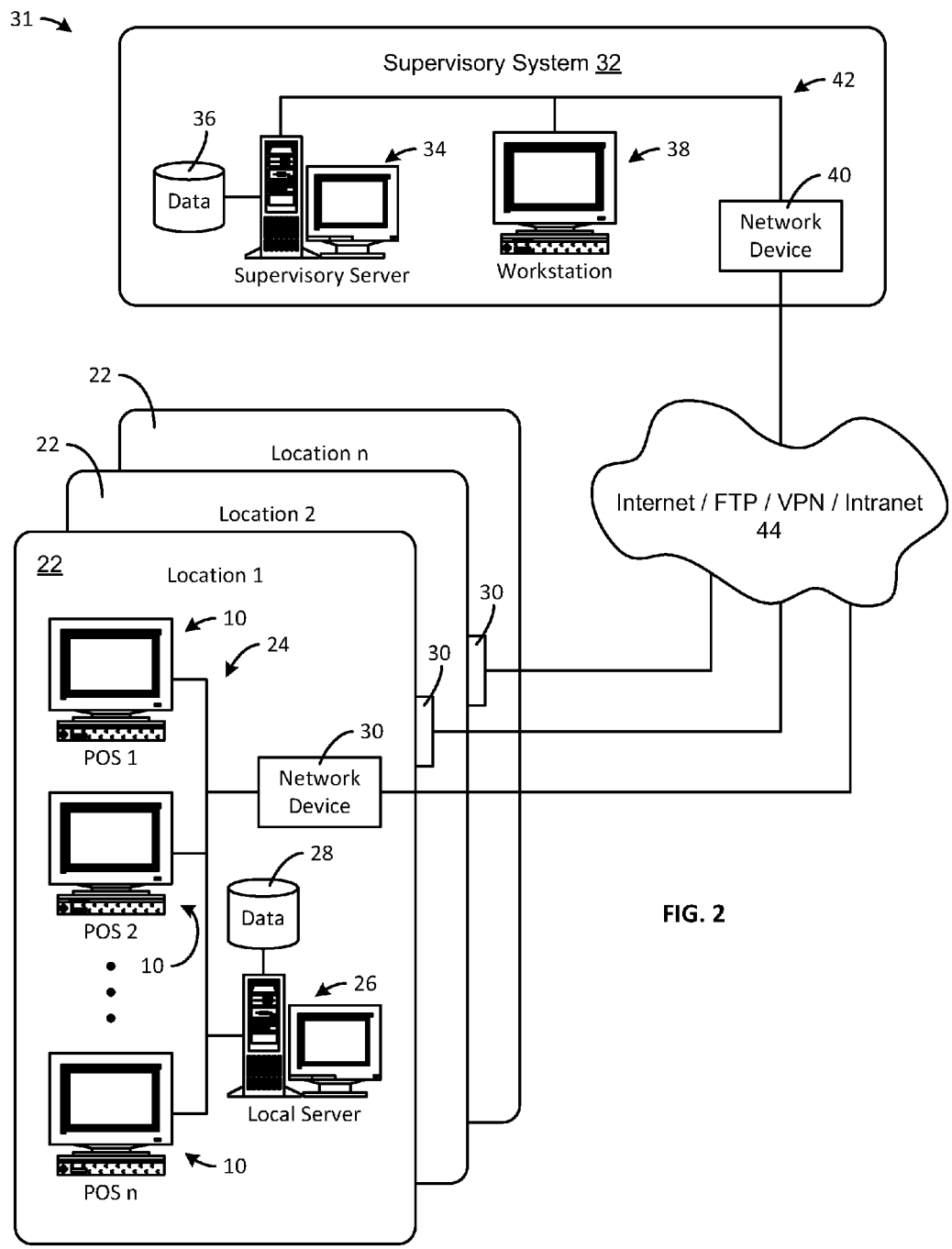
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a standalone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

Figure 3:
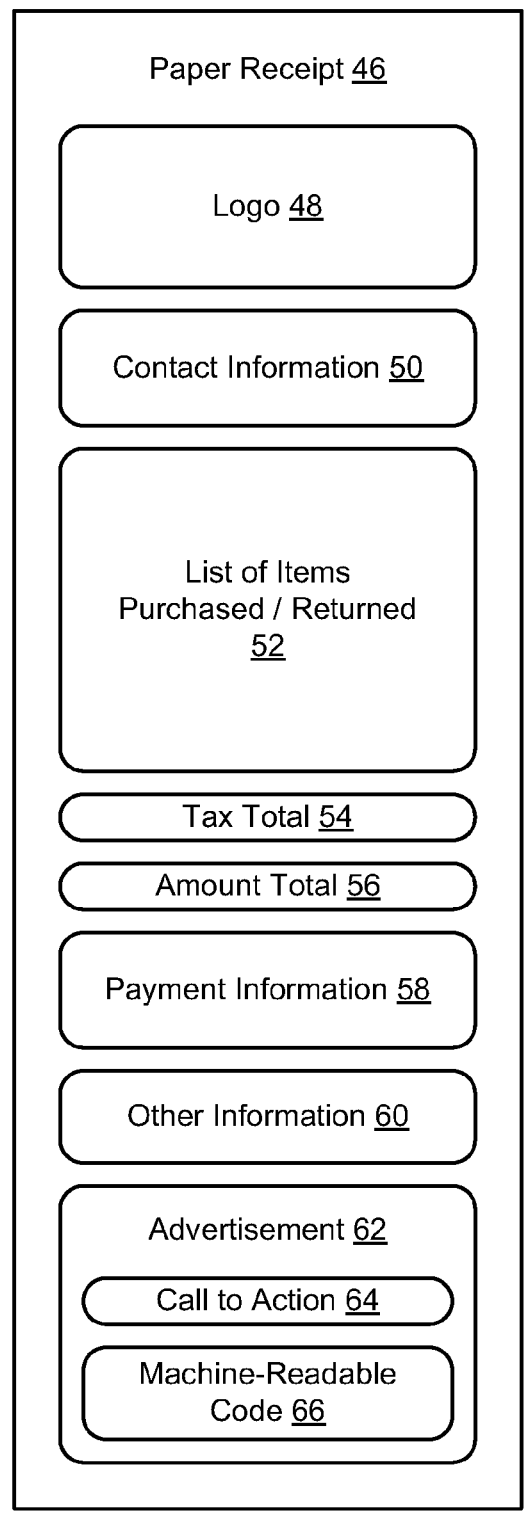
FIG. 3 is a schematic block diagram of one embodiment of a receipt in accordance with the present invention.

Referring to FIG. 3, in selected embodiments in accordance with the present invention, a POS system 10 may output a receipt 46. For example, a printer 20b of a POS system 10 may output a paper receipt 46. A receipt 46 may perform various functions. Primarily, a receipt 46 may document a financial transaction (e.g., sale or return). However, a receipt 46 may also deliver one or more marketing messages to a consumer. In selected embodiments, a receipt 46 may include a logo 48, contact information 50, a list 52 of items purchased or returned, a total 54 indicating the sales tax assessed or returned, a total 56 indicating 56 the amount paid or returned, payment information 58, other information 60, or the like or combinations or sub-combinations thereof.

A logo 48 may reinforce the brand and image of the associated entity within the mind of a consumer. By including contact information 50 on a receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within a receipt 46 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like. The other information 60 will also typically include a machine readable code such as a barcode which provides identifying information about the transaction. The barcode may include information such as the store where the items were purchased, the time of purchase, the total price of the transaction, etc.

In selected embodiments, a receipt 46 may include an advertisement 62. An advertisement 62 may include a call to action 64 inviting or motivating a recipient of the receipt 46 to take a particular step or action. For example, a call to action 64 may invite or motive a consumer to visit a particular website, download a particular application, or the like. Thus, the call to action 64 may invite a customer to download an electronic receipts application to their mobile electronic device. To increase the likelihood that a consumer will respond favorably to the call to action 64, an advertisement 62 may include an enabler facilitating the desired step or action. For example, in selected embodiments, an advertisement 62 may include a machine-readable code 66. Upon scanning the code 66 (e.g., scanning the code 66 using a camera on a mobile computing device such as mobile telephone, personal digital assistant (PDA), or tablet computer or reader, or the like), a consumer may be directed to a desired website (e.g., a particular URL), initiate the download of a particular application, initiate the download of a resource corresponding to a transaction (e.g., an electronic receipt), or the like.

A machine-readable code 66 may comprise a barcode. For example, in certain embodiments, a machine-readable code 66 may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

The data encoded within a machine-readable code 66 may vary between different embodiments and different purposes (e.g., purposes or goals of an advertisement 62). In selected embodiments, a machine-readable code 66 may encode a transaction identification (ID). A transaction ID may uniquely identify a particular transaction (e.g., a transaction documented by a corresponding receipt 46). Alternatively, or in addition thereto, a machine-readable code 66 may further encode an advertisement ID (e.g., an ID indicating which particular combination of call to action 64, graphics, or the like accompanied the machine-readable code 66). A machine-readable code 66 may also encode a web address or URL.

As with a machine-readable code 66, the nature or characteristics of an advertisement 62 and call to action 64 may vary according to a purpose thereof. In general, the purpose of an advertisement 62 and the various components 64, 66 thereof may be to benefit, economically or otherwise, a consumer, an entity (e.g., an entity issuing the receipt 46), or some combination thereof. For example, in selected embodiments, the purpose of an advertisement 62 may be to transition a customer from using paper receipts 46 to using electronic (i.e., paperless) receipts.

At one level, the use of electronic receipts may conserve natural resources by reducing the need for and consumption of paper. However, the use of electronic receipts may have other advantages to both a consumer and an entity issuing the electronic receipts. For example, electronic receipts may enable a consumer to more easily collect and keep a highly detailed record of his or her spending. Entities issuing electronic receipts may benefit from additional marketing opportunities that the electronic receipts provide.

Figure 4:
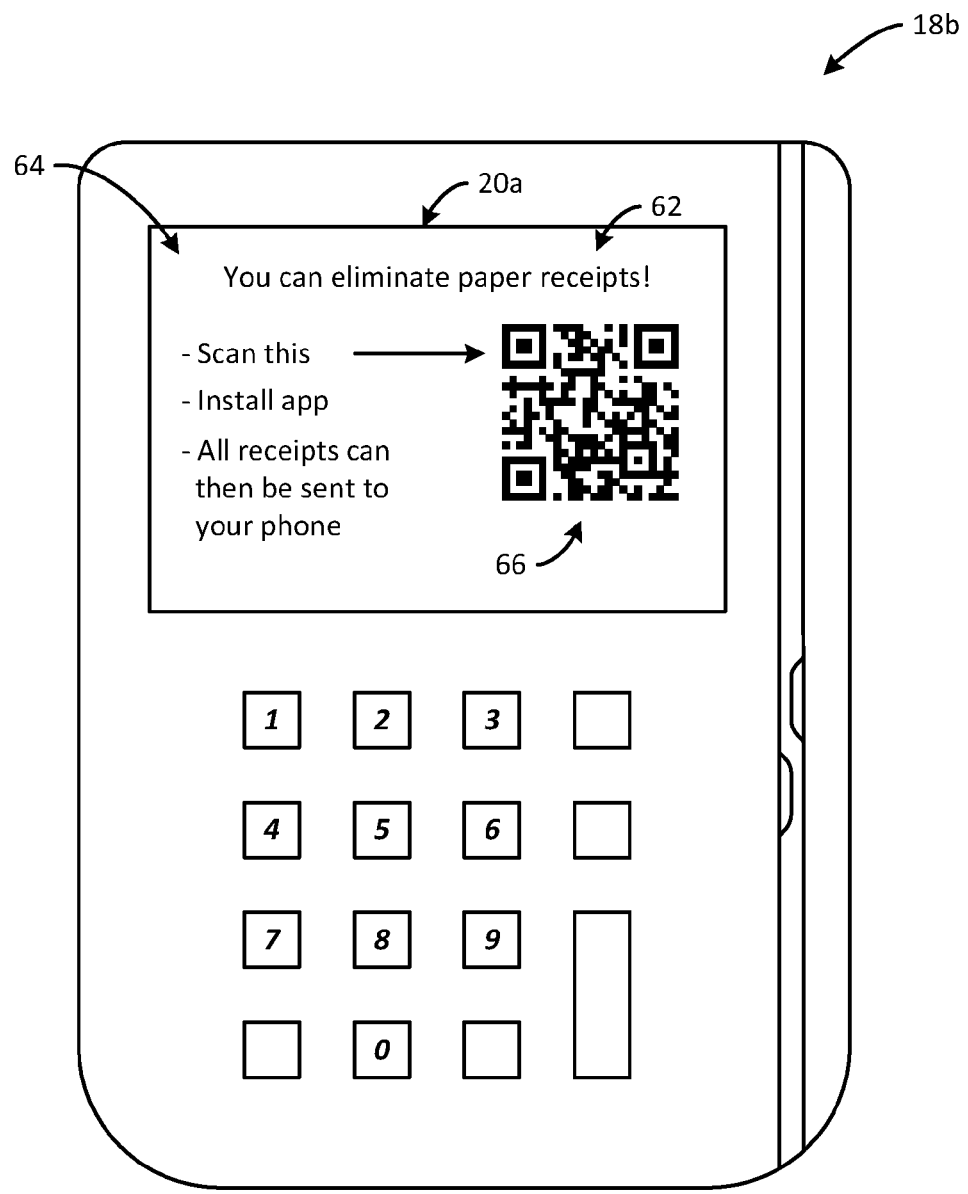
FIG. 4 is an illustration showing how a card reader (e.g., credit card reader, debit card reader) may be used as a customer-facing display in certain embodiments in accordance with the present invention.

Referring to FIG. 4, as set forth hereinabove, an advertisement 62 may be presented to a customer via a printed receipt 46. Alternatively, or in addition thereto, an advertisement 62 (e.g., the same advertisement 62 or a different advertisement 62) may be presented to a customer via some other output mechanism 20. For example, in selected embodiments, one or more advertisements 62 may be presented to a customer via a card reader 18*b* or a customer-facing display screen 20*a*.

A customer-facing display 20*a* may take various forms. In selected embodiments, a customer-facing display 20*a* may be embodied as a stand-alone monitor dedicated to presenting information, advertisements 62, or the like to a customer at a POS. Alternatively, a customer-facing display 20*a* may be a multi-use screen capable of performing various functions. For example, in certain embodiments, a customer-facing display 20*a* may be embodied as a screen on a card reader 18*b*. That is, during at least some portion of a transaction, an advertisement 62 may be displayed on a screen or a portion of a screen of a card reader 18*b*.

Figure 5:
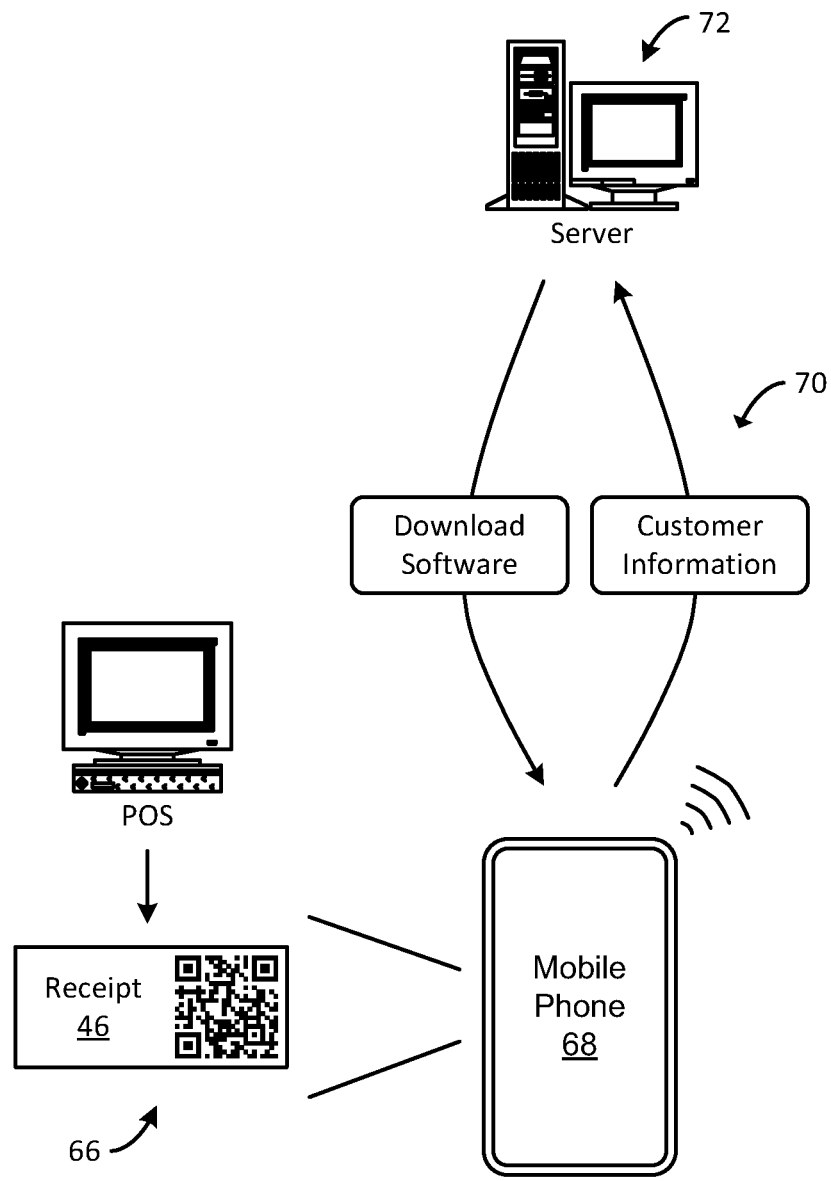
FIG. 5 is a block diagram illustrating the flow of data within one embodiment of system in accordance with the present invention.

Referring to FIG. 5, a customer may download software to a mobile electronic device 68. The mobile electronic device 68 may be a smart phone, tablet PC, etc. Often, the customer will have previously received a paper receipt 46 which includes an invitation to use electronic receipts instead of paper receipts. The paper receipt 46 may have had a machine readable code 66, such as a QR code. The machine readable code may have information embedded there such as a webpage address where the customer may download software to the mobile electronic device 68. As indicated, the customer may take a picture of the QR code 66 with the camera of the mobile electronic device 68. Upon such, the mobile device 68 may be directed to a webpage where the customer may download the desired software, often referred to as an application, or 'APP'.

As indicated at 70, the customer may provide identifying customer information and create an account with the computer server 72 which handles electronic receipts. The computer server 72 may likewise transmit software and account information to the mobile device 68. The customer would then have a customer account with a retailer enabling them to electronic receipts and would have software on a mobile device 68 which enables them to manage electronic receipts.

Figure 6:
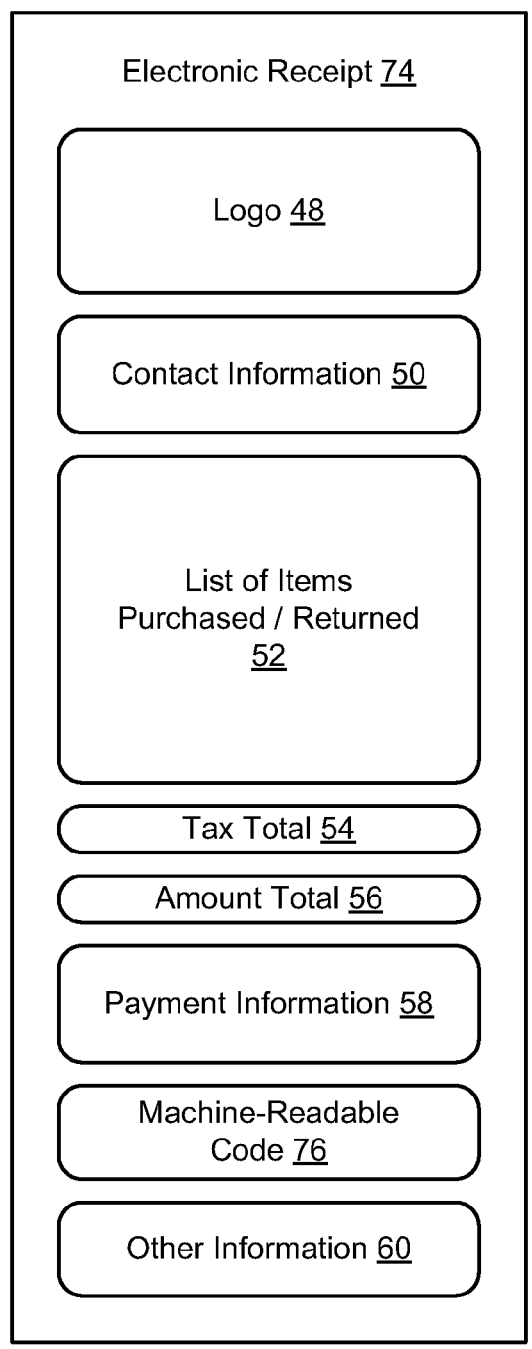
FIG. 6 is a schematic block diagram of one embodiment of a receipt in accordance with the present invention.

Referring to FIG. 6, a POS system 10 may output an electronic receipt 74. A customer may have elected to receive an electronic receipt instead of a paper receipt. The POS system 10 may then output an electronic receipt 74. An electronic receipt 74 is typically presented to a customer in a manner similar to a paper receipt. The electronic receipt 74 may include a store logo 48, contact information 50, a list 52 of items purchased or returned, a total 54 indicating the sales tax assessed or returned, a total 56 indicating 56 the amount paid or returned, payment information 58, a machine readable code 76 identifying the transaction, and other information 60 as desired, as well as combinations or sub-combinations thereof.

A machine-readable code 76 may comprise a barcode. For example, in certain embodiments, a machine-readable code 76 may comprise a conventional barcode or a two-dimensional barcode such as a QR code. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

As regards the returns process, the data encoded within a machine-readable code 76 may encode a transaction identification (ID). A transaction ID may uniquely identify a particular transaction (e.g., a transaction documented by a corresponding receipt 74). The machine-readable code 76 may include a data hash of desired information describing the purchase transaction. For example, the code 76 may contain the store and POS terminal where the transaction occurred, the time of the transaction, the total price of the transaction, etc. With such information, the returns associate may scan in the machine-readable code 76 or key in a corresponding numerical code and obtain sufficient information to demonstrate the legitimacy of the receipt.

Figure 7:
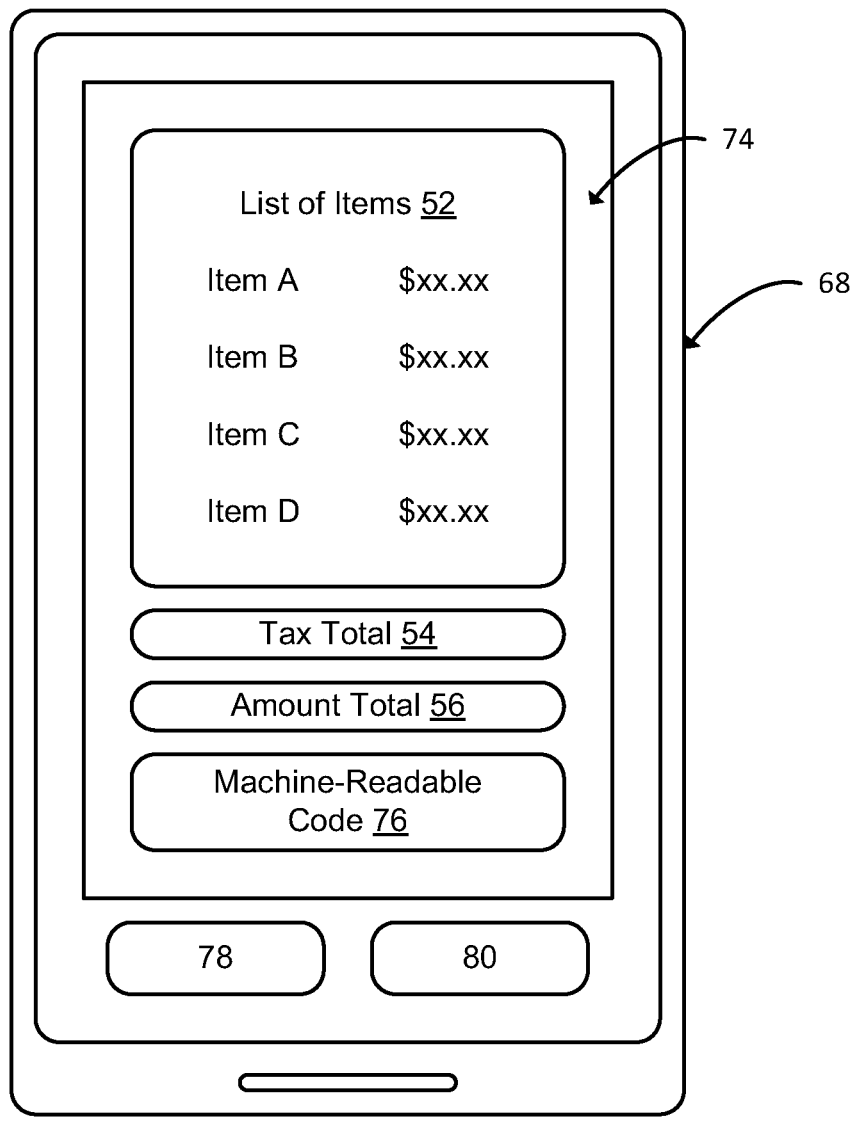
FIG. 7 is a schematic block diagram of one embodiment of a receipt viewed on a mobile electronic device in accordance with the present invention.

Referring to FIG. 7, the mobile electronic device 68 preferably displays the electronic receipt 74 in a manner similar to the appearance of a paper receipt 46. The software on the mobile electronic device 68 allows a person to view their electronic receipts and to manage their receipts in many ways similar to a paper receipt. The software provides virtual buttons 78, 80 to the customer to facilitate completion of various steps necessary for completing a return.

Figure 8:
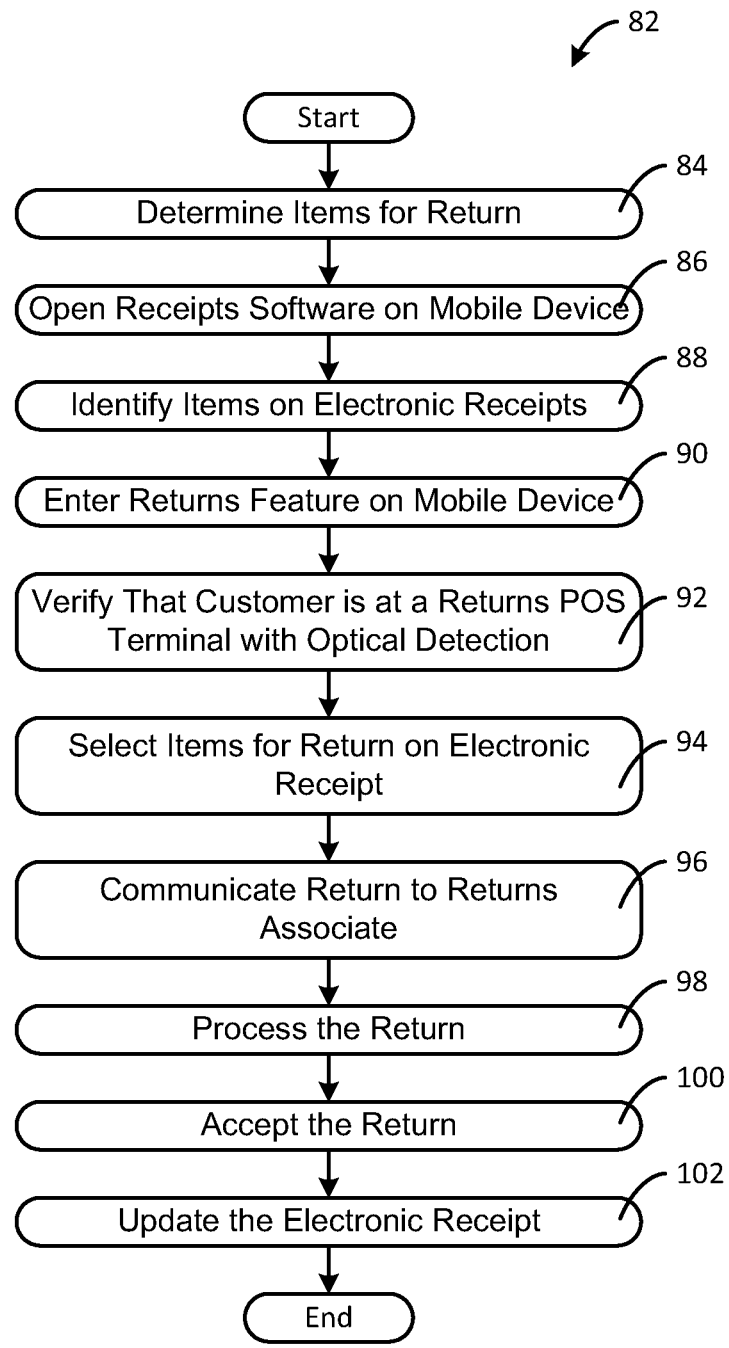
FIG. 8 is a block diagram of one embodiment of a method for completing a return in accordance with the present invention.

Referring to FIG. 8, a customer may use the electronic receipt to return an item at a brick and mortar store. FIG. 8 generally illustrates the process 82 which is used to accomplish a return with an electronic receipt 74. With electronic receipts, the customer will have access to the receipt on their computer device. In order to make the receipts more usable to the customer, it is desirable to provide enhanced functionality as compared to simply providing the customer with an image of the receipt. As such, the customer will typically utilize software on their mobile electronic device 68 to manage the electronic receipts. The software may perform many functions allowing the customer to perform tasks such as reviewing receipts, and also allowing the customer to complete returns with the electronic receipt.

It is desirable that certain features of the returns process cannot be completed unless the customer is present at a returns POS terminal at a store and is completing a returns transaction. A significant factor in disallowing many aspects of the returns process until the customer is at a store is to ensure consistency between the electronic receipt and the customer's actual actions. For example, if a customer were to complete the returns process within the software on their mobile electronic device 68, the software may mark the item as returned on the electronic receipt. If this were performed without completing an actual return at the store, the receipt would show an item as returned while the customer retains possession of the item. This may cause problems with the customer obtaining a reimbursement, warrantee service, etc. Moreover, this would prevent or hinder the customer from actually returning the item at the store if necessary, as the receipt would show the item as having already been returned. As such, it is typically desirable to prevent a customer from completing a returns process or modifying an electronic receipt unless the customer is present at a returns POS terminal and is actually completing the returns process.

In returning an item, the customer may typically begin by determining 84 if they have any items which need to be returned. This often occurs at the customer's residence. Where a customer decides that they have items to return, they will transport these items to the store for a return. On their mobile electronic device 68 (typically a smart phone or a tablet) the customer will launch the electronic receipts software 86. Within the software, the customer will select the receipt which contains the items in question and identify 88 those items on the electronic receipt.

The customer may enter 90 the returns feature within the electronic receipts software on their mobile device 68. In order to prevent problems with inconsistent receipts, returns functionality will be disabled and the electronic receipts software will verify that the customer is present 92 at a returns POS terminal within a store. Once the electronic receipts software has verified that the customer is at a returns terminal inside of a store, the software will enable the returns functionality. The customer may then select 94 items for return on an electronic receipt. The customer then communicates 96 with and interacts with a returns associate at the returns POS terminal so that the associate may conduct the return. The Sales associate then processes 98 the return and the customer accepts 100 the return. The customer provides the returned item to the returns associate and the customer is credited back the cost of the item. The customer's electronic receipt may then be updated 102.

Figure 9:
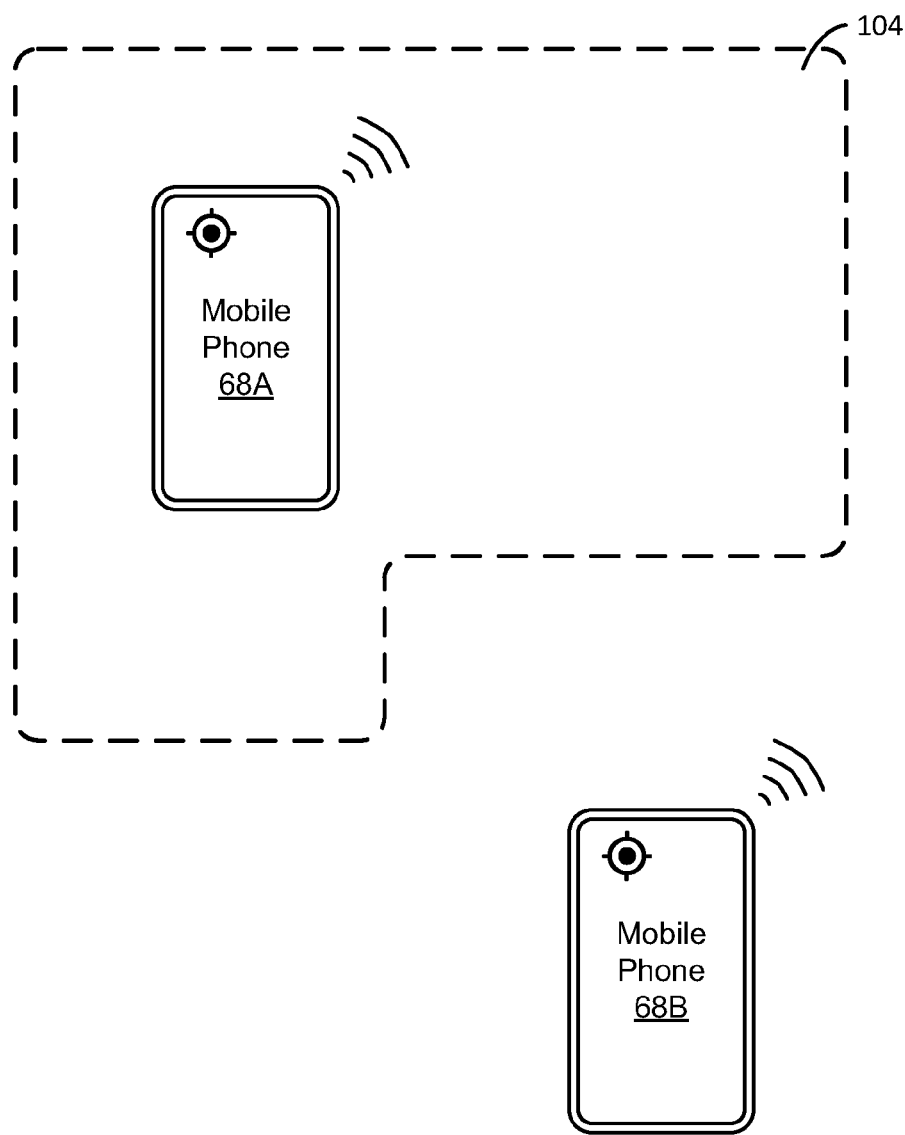
FIG. 9 is a block diagram of one embodiment of a method for verifying the location of a mobile electronic device in accordance with the present invention.

Referring to FIG. 9, the electronic receipts software disables certain features and functionality when the customer is not at within a store or at a returns POS terminal and enables those certain features when the customer is inside of a store or, more particularly, at a returns terminal. A significant reason for this is to prevent the customer from inadvertently 'returning' an item within the electronic receipts software without actually returning the item to the store, as this would typically mark the item as returned on the electronic receipt and prevent the customer from later returning the item to the store.

As a first measure of verifying that the customer is at a returns terminal, the electronic receipts software may use geofencing to determine whether a customer is in a store or not. The electronics receipts software may activate a GPS unit within the mobile electronic device 68 to determine the location of the device. The electronic receipts software may then compare the location of the mobile device 68 with the known geographic perimeter of a store 104 to determine if a customer is in the store 104 or not.

By way of example, the electronic receipts software may communicate the location of the mobile electronic device 68 to an electronic receipts server and the server may compare the location of the device 68 to known store locations. Alternatively, the electronic receipts software may include data identifying the geographic locations of the stores near the customer. This data may be downloaded when the customer installs the software, or may be downloaded as necessary due to the customer using the electronic receipts software.

By comparing the location of the mobile electronic device 68 with the geographic perimeter or location of a store 104, the electronic receipts software may distinguish whether the mobile device 68 is inside of or near to the store (68A) or at a location outside of the store (68B). If the mobile electronic device 68 is inside of a store 104, the electronic receipts software may proceed to a second level of authentication as desired.

Figure 10:
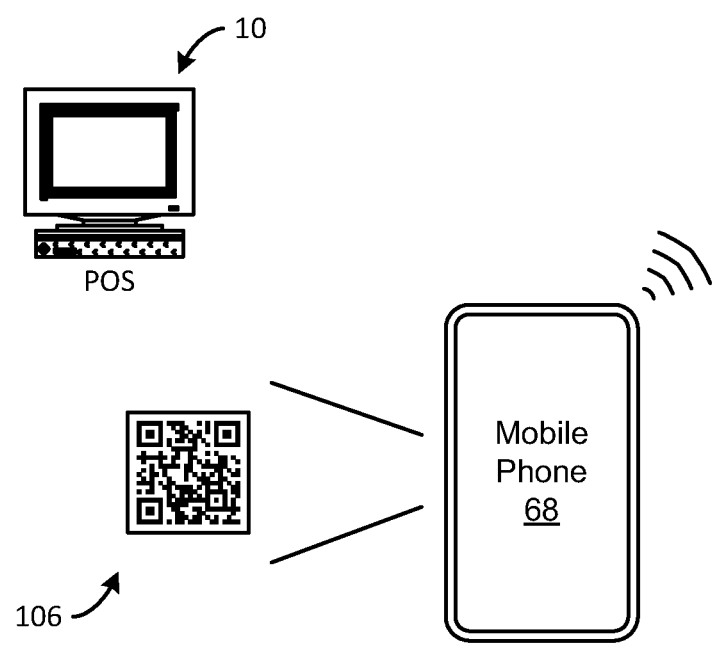
FIG. 10 is a block diagram of one embodiment of a method for verifying the location of a mobile electronic device in accordance with the present invention.

Referring to FIG. 10, the electronic receipts software may use optical imaging to determine if a customer is at a returns terminal 10. The electronic receipts software may use the camera of the mobile electronics device 68 to record images from the returns POS terminal 10. The recorded images may be analyzed to determine if the mobile electronic device is present at a POS terminal.

By way of example, the electronic receipts software may request that the customer capture an image of a machine readable code 106, such as a QR code. The electronic receipts software may then analyze the recorded image to determine if the image represents a returns POS terminal. For example, the electronic receipts software may include a bar code reading application or a bar code reading module 108. The bar code reading module may permit a person to take a picture of a machine readable code such as a QR code with the mobile device camera and decode the machine readable code. The information contained within the machine readable code may indicate if the machine readable code was imaged at a POS terminal. The electronic receipts software may then determine that the mobile electronic device is at a POS terminal.

Figure 11:
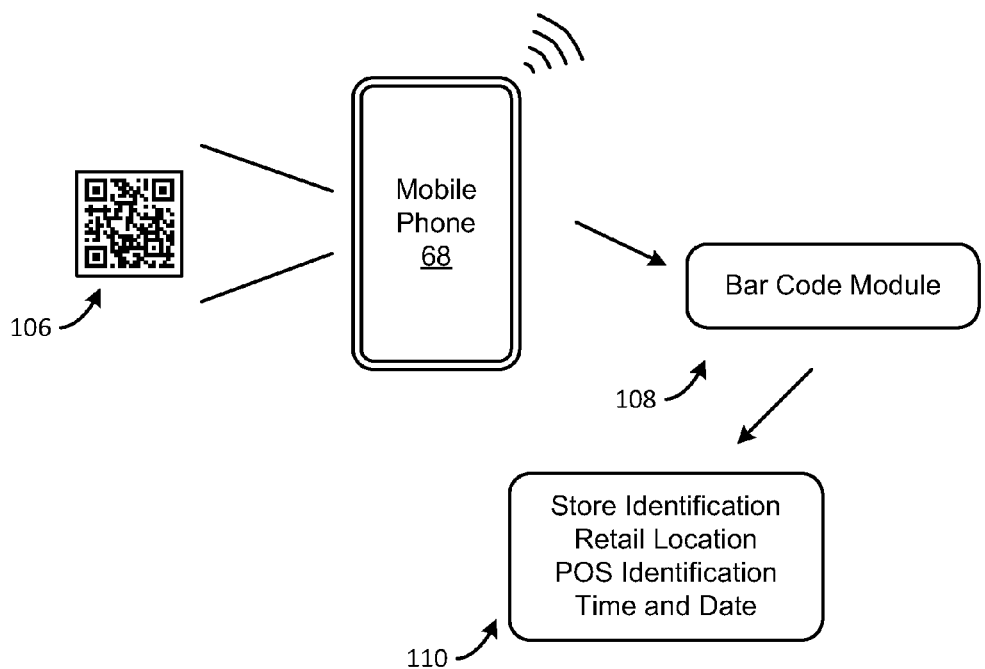
FIG. 11 is a block diagram of one embodiment of a method for verifying the location of a mobile electronic device in accordance with the present invention.

The electronic receipts software identifies particular pieces of information to verify that the mobile electronic device 68 is at a POS terminal. Referring to FIG. 11, the machine readable code 106 may encode various pieces of data 110. The machine readable code 106 may contain the store identification (i.e. identifying the retail chain), the retail location (the individual store itself), the identification or number of the returns POS terminal, and even the current time and date. It will be appreciated that different types of machine readable codes may provide carrying amounts of information. As such, it may be desirable to use a particular type of size of machine readable code 106 because of its data carrying capacity.

The electronic receipts software may use the store identification and retail location to verify that the customer is present at a retail store and is actually making a returns transaction. The electronic receipts software may use information such as the returns POS terminal identification, the time, and the date to record when and where the customer completed the returns transaction. IT can thus be appreciated that the machine readable code may provide several purposes, including authentication the customer's location at a retail location to authorize a return and recording the location of the return for future purposes.

When a customer approaches the returns terminal, the returns associate may present the machine readable code 106 to the customer in a variety of different ways. The machine readable code 106 may be a printed code, such as a plastic laminate or sticker affixed near the returns POS terminal. The machine readable code 106 may also be a printed code that is affixed to a card or book. The returns associate may present the printed machine readable code to the customer.

Figure 12:
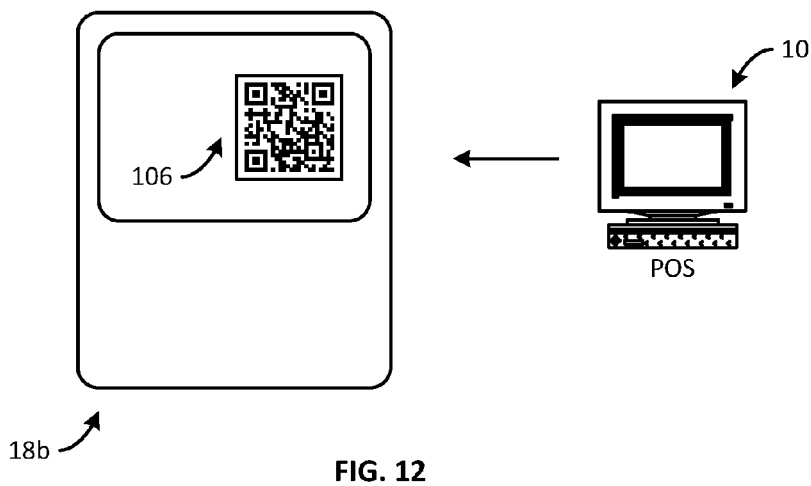
FIG. 12 is a block diagram of one embodiment of a method for verifying the location of a mobile electronic device in accordance with the present invention.

Referring to FIG. 12, the machine readable code 106 may also be presented to the customer in electronic form. The machine readable code may be presented to the customer via the display screen of a card reader 18b or other input device. The returns POS terminal 10 may, when requested, transmit a machine readable code 106 to a card reader 18b or otherwise cause the card reader to display the machine readable code. In this scenario, the machine readable code may be created on demand and contain updated information such as the time and date that the machine readable code was created and presented, and thus the time and date that the customer was present at the returns POS terminal making a return.

The camera of the mobile device 68 may be used by the bar code module 108 to record the machine readable code 106. The electronic receipts software (and bar code module) may analyze the machine readable code to recover the embedded information from the machine readable code. Particularly, the electronic receipts software may recover sufficient information to determine that the customer is present at a returns POS terminal inside of a proper retail location.

The electronic receipts software may contain sufficient information to determine if the customer is at a returns POS terminal. By way of example, the electronic receipts software may contain a code or data which identifies the store. Additionally, the electronics returns software may contain a list or database of codes corresponding to individual retail locations. The electronic receipts software may also contain codes identifying particular POS terminals or types of POS terminals. The electronic returns software may analyze the machine readable code 106 and compare the data contained therein with the stored data to verify that the customer is present at a retail location and at a returns terminal.

The mobile electronic device 68 may also communicate with a returns server 72 or other computer to upload data from the machine readable code or download comparison data to thereby determine if the mobile electronic device is present at a returns POS terminal 10.

The electronic receipts software may thus analyze an optical image such as a machine readable code, compare the data contained therein with known data, determine if the mobile electronic device is present at a returns POS terminal 10, and if present at a returns POS terminal, unlock the returns functionality of the electronic receipts software on the mobile electronic device.

Figure 13:
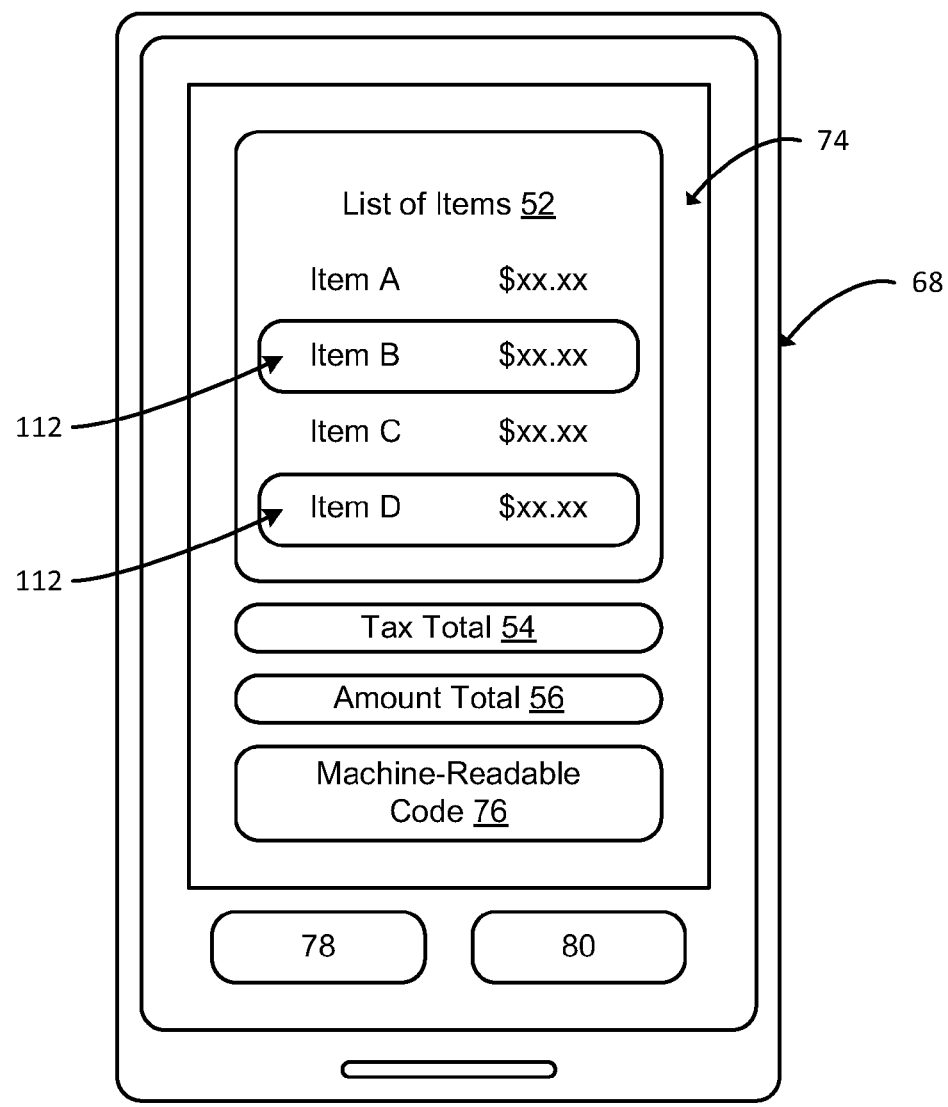
FIG. 13 is a schematic block diagram of one embodiment of a receipt viewed on a mobile electronic device in accordance with the present invention.

Referring to FIG. 13, a customer may proceed with the returns functionality of the electronic receipts software after verification that they are at a returns terminal. The customer may view a receipt 74 on their mobile electronic device 68 and locate the items which they want to return. By way of example, the customer may desire to return items B and D on the receipt 74. The customer may select the desired items, such as by touching these items on the screen of the mobile electronic device 68 and confirm the desire to return these items. The items which are selected for return may be highlighted such as by being circled on the electronic receipt as indicated at 112.

The customer may then show the electronic receipt to the returns associate. The electronic receipt may contain a machine readable code 76 which provides information about the initial purchase transaction. The machine readable code may be a barcode or a 2D barcode such as a QR code so as to provide more information about the original purchase. The returns associate may scan the code 76 from the phone with an optical scanner, or may alternatively key in the numeric code associated with the machine readable code 76.

After entering the machine readable code 76 into the returns POS terminal, initial purchase data may be loaded into the returns terminal. Such data may be a hash of the original purchase amount, time, and location as may be stored in the machine readable code. The returns associate may then have the customer confirm the return on the mobile electronic device 68 and then complete the return on the returns terminal.

The electronic receipt 74 on the mobile device 68 may be updated. The electronic returns software may update the electronic receipt 74 by marking through the returned items with a line, as indicated by lines 114 in FIG. 14. The electronic receipts software may save the modified receipt in place of the original receipt. Alternatively, the electronic returns software may download an updated receipt from the store server which processes or creates the electronic receipts.

As described above, the returns process may operate with the electronic returns software largely managing the electronic receipt 74. The software can be used to select the items, confirm the return, and update the electronic receipt. The returns associate can require that the customer complete the process within the electronic receipts software before completing the return process within the returns terminal to ensure that the customer's receipt 74 is correctly updated. Such a system is advantageous as it does not require that the customer have an active data connection for their mobile electronic device 68 as it need not communicate with an electronic receipts server. Additionally, the returns terminal need not be in communication with an electronic receipts server, but can handle the return locally.

Figure 15:
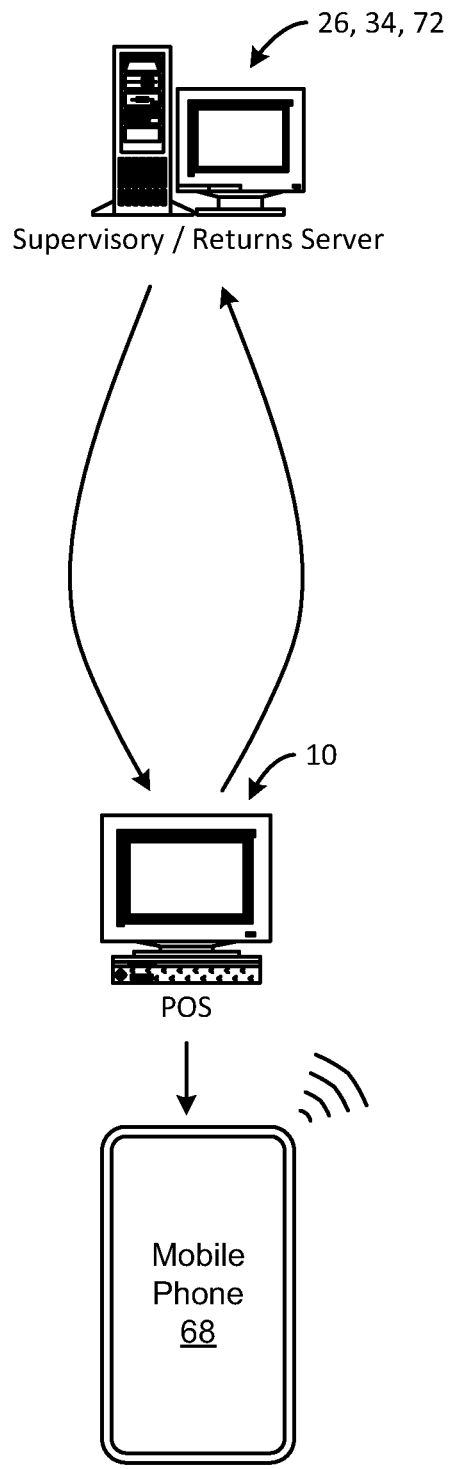
FIG. 15 is a block diagram illustrating the flow of data within one embodiment of system in accordance with the present invention.

Referring to FIG. 15, a more robust electronic returns process may be implemented wherein communication is present between a server 72 which handles electronic receipts or electronic returns and rely on that server to complete the returns process. In such a process, the server may reconcile the return. In such a process, the server may verify a purchase and authorize a return based on the electronic record of the purchase rather than a returns associate verifying a purchase and authorizing a return based on the receipt. This may provide a returns process which is better secured against erroneous receipts.

Figure 14:
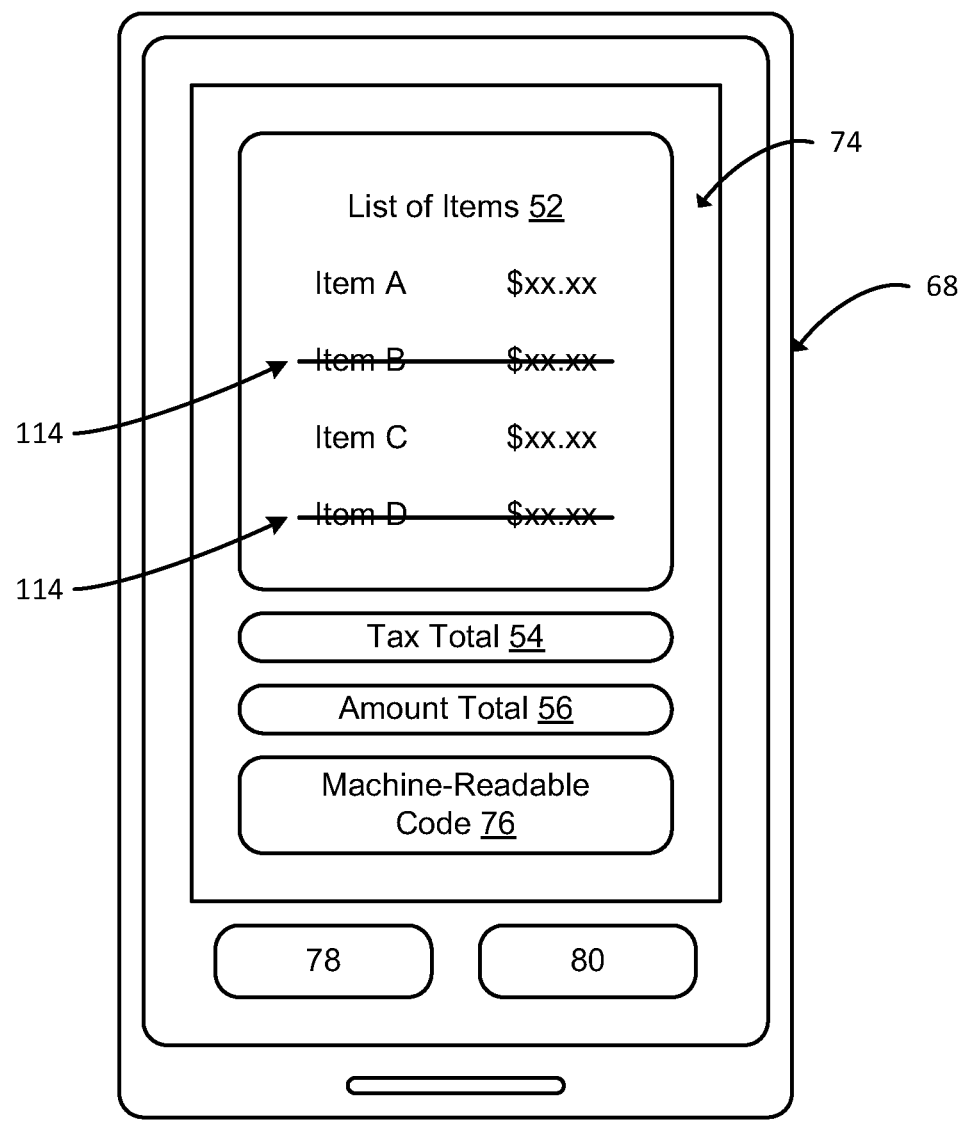
FIG. 14 is a schematic block diagram of one embodiment of a receipt viewed on a mobile electronic device in accordance with the present invention.

A customer may proceed with the returns functionality of the electronic receipts software after verification that they are at a returns terminal. As indicated in FIGS. 13 and 14, the customer may view a receipt 74 on their mobile electronic device 68 and locate the items which they want to return. By way of example, the customer may desire to return items B and D on the receipt 74. The customer may select the desired items, such as by touching these items on the screen of the mobile electronic device 68 and confirm the desire to return these items. The items which are selected for return may be highlighted such as by being circled on the electronic receipt as indicated at 112.

The customer may then show the electronic receipt to the returns associate. The electronic receipt may contain a machine readable code 76 which provides information about the initial purchase transaction. The machine readable code may be a barcode or a 2D barcode such as a QR code so as to provide more information about the original purchase. The returns associate may scan the code 76 from the phone with an optical scanner, or may alternatively key in a numeric or alphanumeric code associated with the machine readable code 76.

After entering the machine readable code 76 into the returns POS terminal 10, the returns terminal may communicate with a returns server 72 (as shown in FIG. 15). The returns server 72 may verify the original purchase and provide the original purchase information to the returns POS terminal 10. The returns server 72 may provide a current version of the electronic receipt 74 to the returns terminal 10, indicating which items are available for return. Such information may indicate items which have already been returned or which are otherwise not currently available for return. The returns associate may then select the items which are being returned on the returns terminal 10. The returns associate may then complete the return from the returns terminal 10. Upon completion of the return, the returns POS terminal 10 may communicate the return to the returns server 72. The returns server may then update the electronic receipt 74 which is stored on the returns server, indicating the present status of the items on the electronic receipt 74 (i.e. items which are returned or available for return).

The electronic receipt 74 on the mobile device 68 may also be updated. The returns server 72 may update the electronic receipt 74 by marking through the returned items with a line, as indicated by lines 114 in FIG. 14. The returns server 72 may transmit or otherwise make the modified electronic receipt 74 available to the mobile device 68 such that the updated electronic receipt 74 may replace the original electronic receipt.

As described above, the returns process may operate with the returns server 72 largely managing the electronic receipt 74. The returns associate/POS terminal 10 can be used to select the items and confirm the return while the returns server can be used to indicate items available for return, authorize the return, and update the electronic receipt 74. Such a system is advantageous as it ensures that the return is based on accurate information stored by the returns server 72.

The flowchart and block diagrams of the Figures illustrate the architecture, functionality, and operation of possible implementations of systems, methods, and computer program products according to one or more embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. At a mobile electronic device, the mobile electronic device including a processor, system memory, and a camera, a method for returning a purchased item at a store location, the method comprising:

opening electronic receipts software in response to user input, the electronic receipts software including item return functionality for selecting items for return at store locations, the return functionality disabled upon opening the electronic receipts software;

selecting an electronic receipt stored on the mobile electronic device in response to additional user input, the electronic receipt identifying one or more purchased items;

capturing a machine readable code via the camera, the machine readable code associated with a returns POS terminal at the store location;

the processor analyzing the machine readable code to determine that the mobile electronic device is in the vicinity of a returns POS terminal;

enabling the return functionality of the electronic receipts software in response to determining that the mobile electronic device is in the vicinity of the returns POS terminal;

selecting at least one item for return at the store location in response to further user input subsequent to enabling the return functionality, the at least one item selected from among the identified one or more purchased items;

indicating the selected at least one item for entry at the returns POS terminal; and receiving an updated electronic receipt, the updated electronic receipt representing the status of the at least one item as returned.

2. The method of claim 1, wherein the machine readable code is a QR code.

3. The method of claim 1, wherein the machine readable code contains information therein to identify the store location.

4. The method of claim 3, wherein the mobile electronic device recovers said information from the machine readable code and compares said information to stored information to determine if the customer is in a particular retail store.

5. The method of claim 3, wherein the machine readable code contains information therein to identify the particular retail store.

6. The method of claim 1, further comprising a returns associate presenting the machine readable code to the customer when the customer is present at the returns POS terminal.

7. The method of claim 1, wherein the method further comprises the electronics receipts software using GPS to determine if the mobile electronic device is located in the store location.

8. The method of claim 1, wherein indicating the selected at least one item for entry at the returns POS terminal comprises presenting the electronic receipt to a returns associate operating the returns POS terminal;

further comprising the returns associate completing the return of the at least one item at the returns POS terminal; and wherein receiving an updated electronic receipt comprises receiving an updated electronic receipt subsequent to the returns associated completing the return of the at least one item.

9. The method of claim 1, further comprising:
the returns terminal obtaining information regarding an original purchase transaction that corresponds to the identified one or more purchased items.

10. The method of claim 1, wherein selecting at least one item for return at the store location in response to further user input comprises selecting at least one item for return at the store location in response to user input on a touch screen of the mobile electronic device.

11. A computer program product for use at a mobile electronic device, the mobile electronic device including a camera, the computer program product for implementing a method for returning a purchased item at a store location, the computer program product including one or more computer storage devices having stored thereon computer-executable instructions that, when executed at a processor, cause the mobile electronic device to perform the method including the following:

open electronic receipts software in response to user input, the electronic receipts software including item return functionality for selecting items for return at store locations, the return functionality disabled upon opening the electronic receipts software;

select an electronic receipt stored on the mobile electronic device in response to additional user input, the electronic receipt identifying one or more purchased items;

capture a machine readable code via the camera, the machine readable code associated with a returns POS terminal at the store location;

analyze the machine readable code to determine that the mobile electronic device is in the vicinity of a returns POS terminal;

enable the return functionality of the electronic receipts software in response to determining that the mobile electronic device is in the vicinity of the returns POS terminal;

select at least one item for return at the store location in response to further user input subsequent to enabling the return functionality, the at least one item selected from among the identified one or more purchased items;

indicate the selected at least one item for entry at the returns POS terminal; and receive an updated electronic receipt, the updated electronic receipt representing the status of the at least one item as returned.

12. The computer program product of claim 11, wherein the machine readable code is a QR code.

13. The computer program product of claim 11, wherein the machine readable code contains information therein to identify the store location.

14. The computer program product of claim 13, wherein the mobile electronic device recovers said information from the machine readable code and compares said information to stored information to determine if the customer is in a particular retail store.

15. The computer program product of claim 13, wherein the machine readable code contains information therein to identify the particular retail store.

16. The computer program product of claim 11, further comprising computer-executable instructions that, when executed, cause the mobile electronics device to use GPS to determine if the mobile electronic device is located in the store location.

17. The computer program product of claim 11, wherein computer-executable instructions that, when executed, cause the mobile electronics device to indicate the selected at least one item for entry at the returns POS terminal comprise computer-executable instructions that, when executed, cause the mobile electronics device to present the electronic receipt to a returns associate operating the returns POS terminal; and wherein computer-executable instructions that, when executed, cause the mobile electronics device to receive an updated electronic receipt comprise computer-executable instructions that, when executed, cause the mobile electronics device to receive an updated electronic receipt subsequent to the returns associated completing the return of the at least one item.

18. The computer program product of claim 11, wherein computer-executable instructions that, when executed, cause the mobile electronics device to select at least one item for return at the store location in response to further user input comprise computer-executable instructions that, when executed, cause the mobile electronics device to select at least one item for return at the store location in response to user input on a touch screen of the mobile electronic device.

* * * * *

UNITED STATES PATENT AND TRADEMARK OFFICE
CERTIFICATE OF CORRECTION

PATENT NO.       : 8,676,653 B2
APPLICATION NO.  : 13/563371
DATED            : March 18, 2014
INVENTOR(S)      : Stuart Argue Page 1 of 1

It is certified that error appears in the above-identified patent and that said Letters Patent is hereby corrected as shown below:

Title Page, Item (73) Assignee: should read Wal-Mart Stores, Inc., Bentonville, AR Signed and Sealed this
Twenty-sixth Day of August, 2014

Michelle K. Lee
*Deputy Director of the United States Patent and Trademark Office*